United States Patent [19]

Farr, Jr.

[11] 3,787,815

[45] Jan. 22, 1974

[54] APPARATUS FOR THE DETECTION AND CORRECTION OF ERRORS FOR A ROTATIONAL STORAGE DEVICE

[75] Inventor: William W. Farr, Jr., Holliston, Mass.

[73] Assignee: Honeywell Information Systems Inc., Waltham, Mass.

[22] Filed: June 24, 1971

[21] Appl. No.: 156,260

[52] U.S. Cl.. 340/172.5, 235/153 AM, 340/174.1 B

[51] Int. Cl. .......... G06f 11/04

[58] Field of Search .......... 340/172.5, 174.1 B; 235/153 AM

[56] References Cited

UNITED STATES PATENTS

| | | | |
|---|---|---|---|
| 3,647,348 | 3/1972 | Smith et al. | 340/172.5 X |
| 3,601,809 | 8/1971 | Gray et al. | 340/172.5 |
| 3,412,382 | 11/1968 | Couleur et al. | 340/172.5 |
| 3,546,677 | 12/1970 | Barton et al. | 340/172.5 |
| 3,548,384 | 12/1970 | Barton et al. | 340/172.5 |
| 3,611,315 | 10/1971 | Murano et al. | 340/172.5 |
| 3,614,746 | 10/1971 | Klinkhamer | 340/172.5 |
| 3,618,040 | 11/1971 | Iwamoto et al. | 340/172.5 |
| 3,643,225 | 2/1972 | Rice et al. | 340/172.5 |
| 3,283,307 | 11/1966 | Vigliante | 340/172.5 |
| 3,521,240 | 7/1970 | Bahrs et al. | 340/172.5 |
| 3,686,641 | 8/1972 | Logan et al. | 340/172.5 |
| 3,689,891 | 9/1972 | Kril | 340/172.5 |

OTHER PUBLICATIONS

Knuth; Donald E., "Fundamental Algorithms - The Art of Computer Programming -Vol. 1.," pp. 235-237, 278, 279; QA 76.5/K57.

*Primary Examiner*—Paul J. Henon
*Assistant Examiner*—Melvin B. Chapnick
*Attorney, Agent, or Firm*—John S. Solakian; Ronald T. Reiling

[57] ABSTRACT

Pages included in a record and stored on a rotational storage device include data, a reverse pointer and a forward pointer, the reverse pointer linking to the previous page and the forward pointer linking to the next page. The reverse pointer of the current page operated on and the address of the previous page addressed are compared generating an error signal if such pointers are dissimilar. In response to the error signal, the page last addressed is readdressed following which the pages of the record are addressed in reverse order until the complete record is transferred to or from the device.

13 Claims, 9 Drawing Figures

INVENTOR
WILLIAM W. FARR, JR.
BY John S. Solakian
ATTORNEY

| DEVICE ADDRESS | POINTER FIELD | | PAGE NUMBER IN THE RECORD |
|---|---|---|---|
| | REVERSE | FORWARD | |
| A-0 | | | |
| A-1 | B-7 | C-2 | FIRST |
| A-2 | | | |
| A-3 | | | |
| A-4 | | | |
| A-5 | | | |
| A-6 | | | |
| A-7 | C-4 | B-7 | FOURTH |
| B-0 | | | |
| B-1 | B-3 | B-2 | FIRST (RECORD 2) |
| B-2 | B-1 | B-3 | SECOND (RECORD 2) |
| B-3 | B-2 | B-1 | THIRD (RECORD 2) |
| B-4 | | | |
| B-5 | | | |
| B-6 | | | |
| B-7 | A-7 | A-1 | FIFTH |
| C-0 | | | |
| C-1 | | | |
| C-2 | A-1 | C-4 | SECOND |
| C-3 | | | |
| C-4 | C-2 | A-7 | THIRD |
| C-5 | | | |
| C-6 | | | |
| C-7 | | | |

Fig. 3.

INVENTOR
WILLIAM W. FARR, JR
BY John J. Solakian
ATTORNEY

INVENTOR
WILLIAM W. FARR, JR
BY John S. Solakian
ATTORNEY

INVENTOR
WILLIAM W. FARR, JR.

BY

ATTORNEY

INVENTOR
WILLIAM W. FARR, JR.

BY John S. Solakian
ATTORNEY

STATE DIAGRAM

| TIME | 36 RPR | 40 PPR | 38 FPR | 300 FRPR | 302 PPPR | 310 FF(1) | 312 | 302 = 312 | 300 = 40 | DATA TO 20 OR 28 |
|---|---|---|---|---|---|---|---|---|---|---|
| PRIOR TO 1ST READ OR WRITE | — | A-1 | — | — | — | 0 | — | — | NO | — |
| AFTER 1ST READ OR WRITE | B-7 | A-1 | C-2 | B-7 | — | 0 | B-7 | — | NO | A-1 |
| AFTER 2nd READ OR WRITE | A-1 | C-2 | B-2 ERROR | B-7 | A-1 | 0 | A-1 | YES | NO | C-2 |
| AFTER 3rd READ OR WRITE | B-1 | B-2 | B-3 | B-7 | C-2 | 0 | B-1 | NO | NO | — |
| AFTER 302 ≠ 312 | B-1 | C-2 | B-3 | B-7 | C-2 | 1 | B-3 | NO | NO | — |
| AFTER 4th READ OR WRITE | A-1 | C-2 | B-2 | B-7 | C-2 | 1 | B-2 | NO | NO | — |
| AFTER 5th READ OR WRITE | B-7 | A-1 | C-2 | B-7 | C-2 | 1 | C-2 | YES | NO | — |
| AFTER 6th READ OR WRITE | A-7 | B-7 | A-1 | B-7 | A-1 | 1 | A-1 | YES | YES | B-7 |
| AFTER 7th READ OR WRITE | C-4 | A-7 | B-7 | B-7 | B-7 | 1 | B-7 | YES | NO | A-7 |
| AFTER 8th READ OR WRITE | C-2 | C-4 | A-7 | B-7 | A-7 | 1 | A-7 | YES | NO | C-4 |

Fig. 7.

INVENTOR
WILLIAM W. FARR, JR.
BY
John J. Solakian
ATTORNEY

APPARATUS FOR THE DETECTION AND CORRECTION OF ERRORS FOR A ROTATIONAL STORAGE DEVICE

BACKGROUND OF THE INVENTION

1. Field of the Invention

This invention relates to rotational storage devices such as drums or disks and more particularly relates to error detection and correction techniques utilized therewith.

2. Description of the Prior Art

In a modern data processing system the need for large data bases and lengthy programs often necessitate information swapping by which information currently in primary storage is exchanged or swapped for newly required information in back-up or secondary storage. Fast primary memory is a limited resource in today's data processing system. Only a few of the most current tasks may reside in primary memory and all other information must be stored in a less expensive higher capacity secondary storage. During swapping, programs or data are transferred from primary to secondary storage to make room for the newly required information which is then transferred to primary storage. During such swaps it is necessary to preserve the integrity of the information swapped. Various techniques have been utilized to detect for errors during swapping of information such as for example parity checking. In addition to the detection of errors, it is important to correct errors wherever possible and within the minimum possible time.

It is accordingly an object of the present invention to provide an improved means for detecting and correcting errors generated during the swapping of information between primary and secondary storage.

SUMMARY OF THE INVENTION

The purposes and objects of the invention are satisfied by providing error detection and correction apparatus for a rotational storage device which device includes means for storing a plurality of pages of a record, each page including data, a reverse pointer and a forward pointer, the reverse pointer linking to the previous page and the forward pointer linking to the next page, The apparatus includes a present pointer register for addressing the current page to be operated upon, a reverse pointer register for storing the address of the page immediately preceding the current page, a forward pointer register for storing the address of the page immediately following the current page and a previous present pointer register coupled to the present pointer register for storing the address of the previous page addressed. Means are included for transferring the contents of the forward pointer register to the present pointer register after the current page addressed is operated upon and further means are included for generating an error signal when the contents of the reverse pointer register and the contents of the previous present pointer register are dissimilar. In response to the error signal, further means are included for transferring the contents of the previous present pointer register to the present pointer register after which additional means are provided for transferring the contents of the reverse pointer register to the present pointer register thereby initiating transfer of the pages in reverse order.

BRIEF DESCRIPTION OF THE DRAWINGS

The advantages of the foregoing configuration of the present invention become more apparent upon reading the accompanying detailed description in conjunction with the figures in which:

FIG. 3 illustrates a pointer table indicating the topology of reverse and forward pointers in an exemplary record;

FIG. 7 is a state diagram utilized to explain the operation of the of the apparatus of the present invention shown in FIG. 6.

DETAILED DESCRIPTION OF THE PREFERRED EMBODIMENTS

Figure 1:
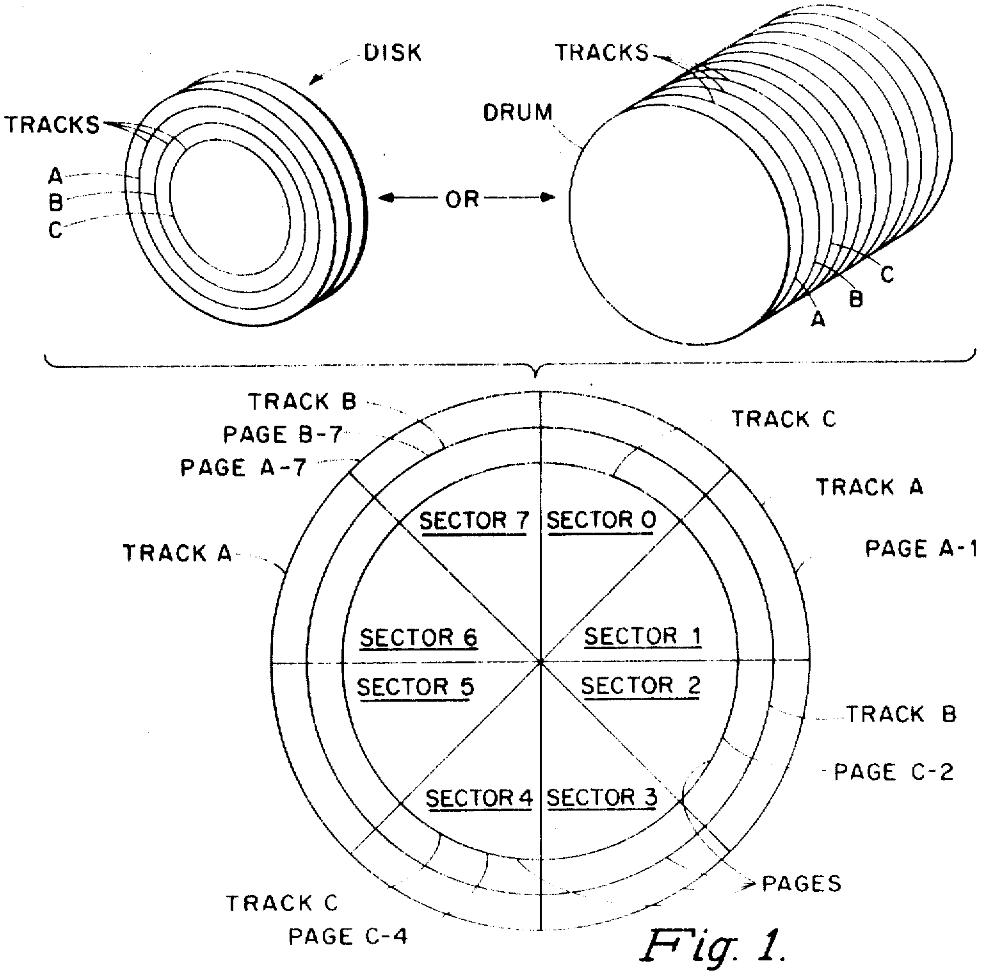
FIG. 1 illustrates a preferred organization of information on the rotational storage device.

FIG. 1 illustrates the basic information organization of the rotational storage device of the present invention. The rotational storage device may be either a disk or a drum and will be hereinafter referred to as a "device." A disk may include several disk surfaces on which concentric information storage tracks such as tracks A, B, and C may be placed. The drum may include several circumferential tracks such as tracks A, B, and C placed side by side on the surface of the drum. Either device may utilize the information organization shown in the lower part of FIG. 1. Although shown as concentric tracks, the tracks may be side by side as on a drum. A plurality of tracks shown by way of example as tracks A, B, and C are divided into a plurality of sectors, in this case eight sectors numbered sectors 0 through 7. That portion of either track within a sector is termed a "page" or "segment." Thus, with three tracks and eight sectors there are 24 possible pages. A particular page is addressed by supplying the sector and track number. If there is more than one device in the system, the device number must also be specified. For purposes of explanation the pages are referred to by the track and sector number. Thus, the page appearing on track A, sector 0, is identified as page A-0.

Figure 2A:
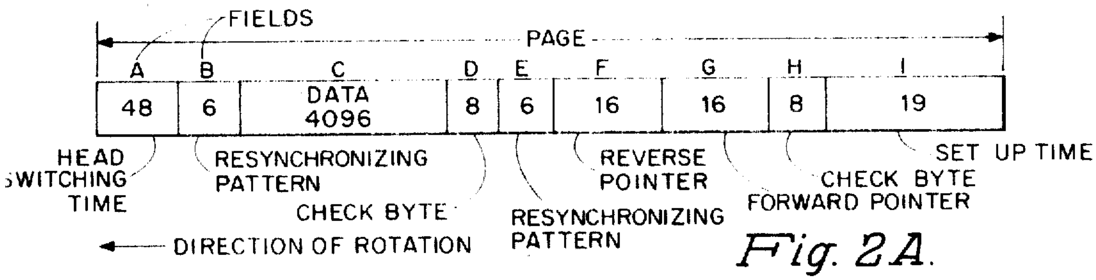
FIGS. 2A, 2B and 2C illustrate various formats for a page of information stored on a rotational storage device.

FIG. 2A illustrates one possible organization or format for each page. The blocks in the format designate fields of a page and the numbers in the blocks for each field indicate by way of example the number of bits in the particular field. Field A is utilized for head switching time and may be a partially recorded area which is long enough to permit head switching and read amplifier stabilization between sectors when changing the selected head to access data recorded on any other track in the device. Field B is a resynchronizing pattern and includes a specific bit pattern which allows the read logic in the device controller to resynchronize itself with the data recorded in field C. Field C is the data field itself. Field D is a check byte which is appended to the data during a write data order and is read by the device controller during a read data order. This check byte may be the logical exclusive or of all the bytes written in data field C. Field D is a specific bit pattern which allows the read logic in the controller to resynchronize itself with the pointers recorded in fields F and G. Field F contains the page address (track and sector) of the page which logically precedes the current page and is designated hereinafter as the "reverse pointer." Field G contains the page address of the page which logically follows the current page and is designated hereafter as the "forward pointer." Field H is a check byte of fields F and G and is similar to the check byte in field D. Field I is the space allocated to allow time to set up the next device action by the program. Head switch time allocation, check byte systems and set up time allocation schemes are well known in the present state of the art and will not be further discussed herein. The present invention concerns itself with the fields C, F, and G, that is, the data field, the reverse pointer and the forward pointer fields and such fields will be discussed relative to the operation of the apparatus of the present invention and are the basis of the discussion hereinafter. The formats of FIGS. 2B and 2C will be discussed hereinafter.

As discussed hereinbefore, each track includes a plurality of pages. A record is defined to include a plurality of logically related pages. Each page in a record is linked to the previous and following page by the reverse pointer and forward pointer respectively. The first page includes a reverse pointer to the last page and a forward pointer to the second page and so on until the last page includes a reserve pointer to the next to the last page and a forward pointer to the first page.

FIG. 3 illustrates the topology of pointers in a five page record. The first page A-1 includes a reverse pointer addressing page B-7 (the fifth page) and a forward pointer addressing page C-2 (the second page). The second through fifth pages are similarly linked. It will be seen that one advantage of this page organization is that to read the record, only the starting page address, in this case page A-1, and depending upon the implementation the range (five) need to be specified to the controller. The controller then transfers data to primary memory starting with the first word of the first page and continues transferring until the last word of the last page is in primary memory.

Now referring to FIGS. 4 and 5, apparatus illustrating the reading and writing techniques utilized with the information organization shown in FIGS. 1 through 3 will be discussed. The apparatus of FIG. 4 includes a processor 20 and a memory 22 coupled together by a memory processor transfer bus 24 which coupling is made by well known techniques. Processor 20 may receive data from data source 26 and is set in the read or write mode by the respective external inputs or under program control. Processor 20 also includes a memory address input, data input and data output as well as other hand shaking terminals to be discussed. Memory 22 may include a page buffer and a data buffer. The data buffer 23 may include storage space for each page of data which may be received from data source 26 or rotational storage device 28. The page buffer includes the page address for each of the pages of a record beginning with the reverse pointer of the first page and ending with the forward pointer of the last page. The page buffer in its simplest form may include a single address to the first page of the record.

The rotational storage device 28 includes outputs indicating the present page number, a read output from which information is transmitted and a data strobe which emits a pulse for each bit position on the device as the device rotates. A read data command input as well as a write information input is also included in the device 28.

The processor 20 and the device 28 are coupled by means of various gates, registers, buffers and counters well known in the art. Although single lines and gates are shown interconnecting the various elements in FIG. 4, the number of actual lines, or gates is dependent on the length of the words stored in memory 22. Also, the number of gates, although shown as a single gate is dependent on the length of the words received at the gate's input. Note that AND gates are shown by symbols having a dot therein and that OR gates are shown in either a "wired or" manner or by symbols having crosses therein. Also it should be understood that various delay and timing means may be inserted in order to avoid any "race" condition. The page buffer address counter 30 is coupled to receive the address of the page buffer 21 in memory 22 and is incremented after each transfer of the address information in page buffer 21. The data range counter 32 is coupled to receive data range information from processor 20 and is used to control the number of transfers during an operation. Data buffer address counter 34 is coupled to receive the address of the data buffer 23 in memory 22 and is incremented after each page transfer. The reverse pointer register 36 is coupled to receive the reverse pointer information from processor 20 during the write operation and from the device 28 during the read operation. Forward pointer register 38 is coupled to receive the forward pointer information from the processor 20 during the the write operation and from the device 28 during the read operation. Present pointer register 40 is coupled to store the address of the page currently being processed. Register 40 is initially loaded with the present pointer information via processor 20 aid is subsequently loaded usually but depending upon the operation with the present pointer information via forward pointer register 38. Buffer 42 is coupled to receive data from processor 20 or from device 28 during the write and read operations respectively and is a temporary storage device providing buffering for data transfer between the processor 20 and the device 28. Buffer 44 is a parallel input to serial output device commonly known in the art. Data received via buffer 42 is shifted out of buffer 44 in response to shift or data strobe pulses and then transferred to the write input device 28. Buffer 44 is utilized during the write operation. Buffer 46 is utilized during the read operation and is a serial input to parallel output device. Data is shifted out of buffer 46 into buffer 42 and then back into the data input of processor 20.

As discussed hereinbefore, the page buffer 21 in the memory 22 includes a plurality of addresses of its record starting with the last page address and ending with the first page address of the record. Page buffer 21 may be constructed by well known techniques, but for purposes of the present discussion it will be assumed to exist in memory 22. Data to be stored in respective pages is included in data buffer 23 in memory 22. Each of the pages of data is received either from data source 26 or from device 28 and will also be assumed for present discussion to exist in memory 22. General operation of the apparatus of FIG. 4 with the timing shown in FIG. 5 will now be discussed. For more detailed operation of such apparatus reference may be made to the patent application entitled "Controller For Rotational Storage Device Having Improved Information Organization", Ser. No. 156,259 invented by William W. Farr, Jr., assigned to the assignee of the present invention, and filed on even date herewith.

Figure 4:
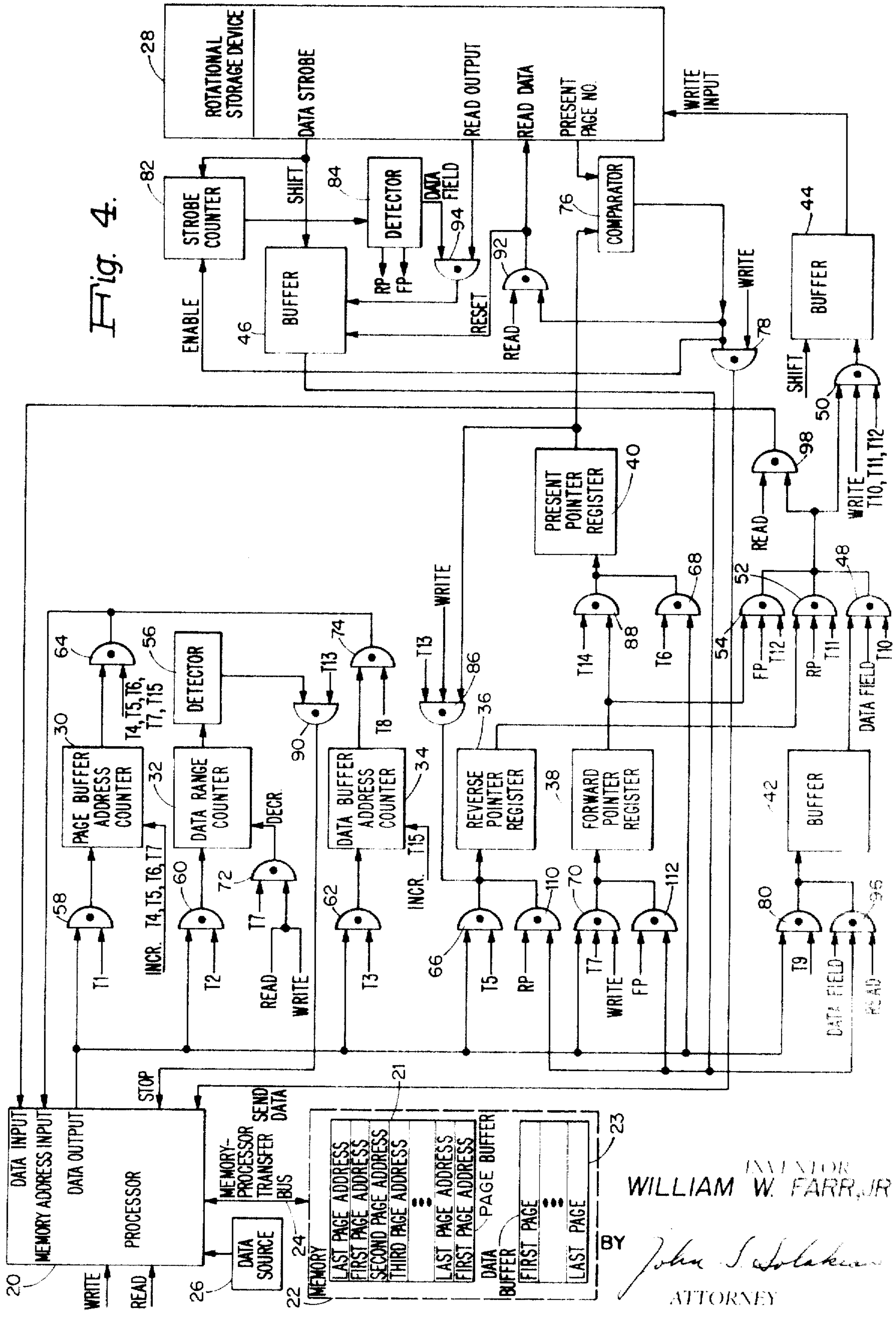
FIG. 4 is a schematic block diagram illustrating the read and write control circuitry utilized in the present invention.
Figure 5:
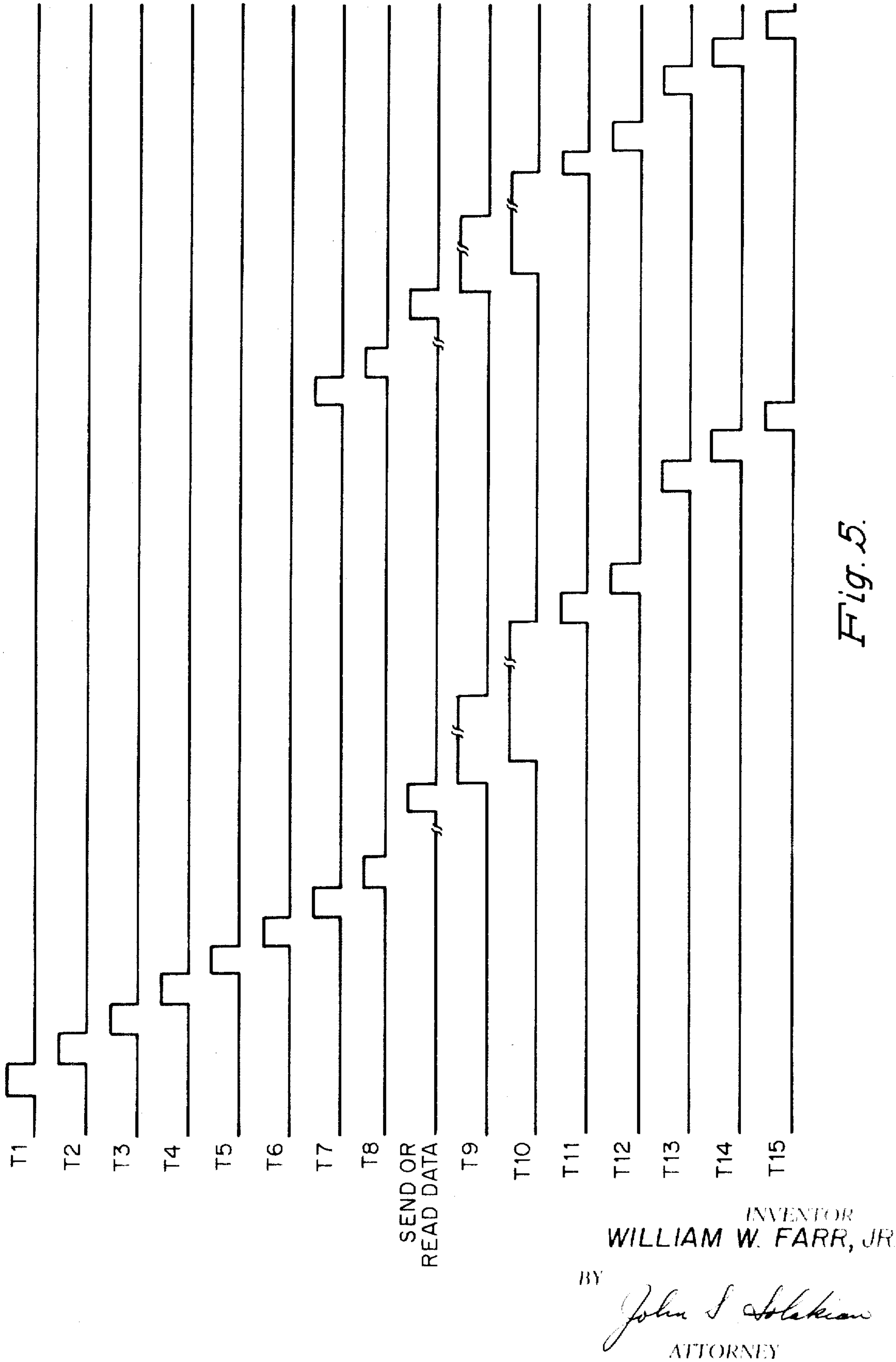
FIG. 5 is a timing diagram illustrating the timing utilized with the control circuitry of FIG. 4.

Generally, for a write operation the operation of the apparatus shown in FIG. 4 follows. Initially at times T1, T2, and T3 respectively, the address of page buffer 21 in memory 22 is supplied to counter 30, the range of data buffer 23 in memory 22 is supplied to counter 32 and the initial address of the data buffer 23 is supplied to counter 34. This information may be supplied under program control. After counter 30 addresses processor 20 at time T4, the controller apparatus, FIG. 4, then accesses the first three page buffer entries, namely the last page address, the first page address and the second page address and stores them in registers 36, 40 and 38 at times, T5, T6 and T7 respectively. Register 40 then addresses the device 28 to select the proper page number. When the page number of the device and the present pointer stored in register 40 agree, the controller becomes synchronous with the device, generates a SEND DATA signal and then at time T9 begins to write data in that page addressed via buffer 42, gates 48 and 50, and buffer 44. The reverse and forward pointers from registers 36 and 38 respectively are then written into device 28 via gates 52 and 54 respectively as well as gate 50 and buffer 44. The contents of register 40 are then transferred into register 36 in order to update the reverse pointer. The forward pointer in register 38 is then transferred at time T13 to register 40 to update the present pointer. A new forward pointer is then obtained from page buffer 21 and stored in register 38 at time T14. The present pointer then addresses device 28 and the process repeats until the data range in counter 32 runs out as detected by detector 56. This condition then commands processor 20 to stop the write operation.

Generally, the operation of the control apparatus shown in FIG. 4 for a read operation is as follows. Initially, as was the case for the write operation, the page buffer address counter 30, the data range counter 32 and the data buffer counter 34 are loaded with their respective information via processor 20. The page buffer 21 in memory 22 may include simply the address of the first page of the record which is to be read. Thus the address of the page buffer stored in counter 30 will address the first page address of the record to be read. The first page address is then at time T6 loaded into the present pointer register 40, and the addressed page of device 28 is selected thereby. After the information in the present pointer register 40 and present page number of device 28 agree, the control apparatus in FIG. 4 then begins to read the page addressed. The data is coupled from the read output of the device 28 via a serial to parallel buffer 46, a temporary storage buffer 42 and finally into processor 20 and memory 22. Following this data transfer and when detector 84 generates the RP and FP signals indicating the reverse and forward pointer fields, the reverse and forward pointers are read from the device 28 into registers 36 and 38 respectively. The forward pointer is then at time T14 transferred to present pointer register 40 to become the present page number to be addressed. The process continues until the data range runs out.

Figure 6:
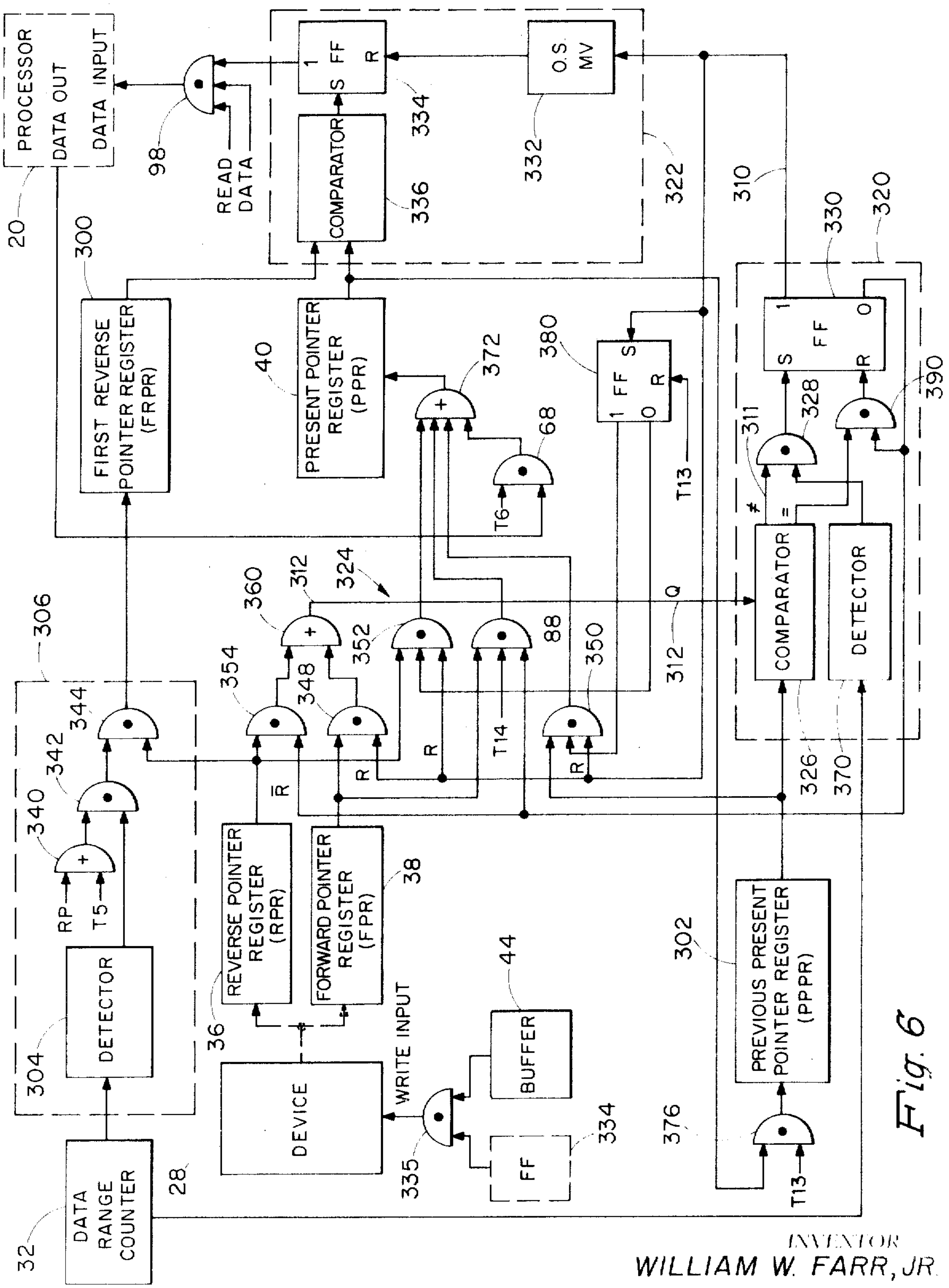
FIG. 6 is a schematic block diagram illustrating the error detection and correction apparatus of the present invention.

Now referring to FIG. 6 together with FIG. 4 the error detecting and correcting apparatus of the present invention will be discussed. In FIG. 6, rotational storage device 28 is shown by dotted line connection connecting to the reverse pointer reigster 36 and forward pointer register 38. Specific connections between these elements are shown in FIG. 4. For the apparatus of the present invention, the present pointer register 40 includes coupling between the forward and reverse pointer registers 38 and 36 respectfully as shown in FIG. 6 beyond those connections shown in FIG. 4. Coupled to reverse pointer register 36 is a first reverse pointer register 300 which is utilized to store the first reverse pointer of the first page accessed when a record is operated upon. That is, when the reverse and forward pointers of the first page of a record are accessed, the first reverse pointer is loaded into register 300. Circuit 306 is utilized to accomplish this result. Present pointer register 40 is coupled to previous present pointer register 302 so that the present pointer of the last page operated upon is stored therein.

Circuit 320 is utilized to generate an error signal when the contents of the previous present pointer register 302 and the contents of the reverse pointer register 36 are dissimilar. This error signal is inhibited from generation until after the second page of a record is operated upon and after the error signal has been generated. Circuit 322 is utilized to inhibit transfer of data between the device 28 and the processor 20 until after the error signal is generated and until the contents of the first reverse pointer register 300 and the present pointer register 40 are similar. Steering gates 324 are utilized to steer information into present pointer register 40 from either forward pointer register 38 during normal operation, from the previous present pointer register 302 immediately after an error signal is generated by circuit 320, and from the reverse pointer register 36 during the error correction phase of operation.

The operation of the apparatus shown in FIGS. 4 and 6 during the read operation is as follows. The page buffer address counter 30, the data range counter 32 and the data buffer address counter 34 are initially loaded with their respective information. According to the information stored in the page buffer address counter 30, the address of the current page to be operated upon is loaded into present pointer register 40. The data is then read from device 28 and stored in its respective location in memory 22. The reverse and forward pointers are then loaded into their registers 36 and 38 respectively. During this time circuit 306 enables the first reverse pointer register 300 to be loaded with the contents of reverse pointer register 36. The contents of the forward pointer register 38 are then loaded into the present pointer register 40 after which the page indicated thereby is operated upon. The data for that page is then transferred to memory 22 after which the reverse and forward pointers are loaded into their respective registers 36 and 38. This process continues for the entire record until the data range runs out. Before the present pointer register 40 is up-dated, the contents thereof are loaded into previous present pointer register 302 which register's contents are constantly compared, by means of comparator 326 and steering gates 324, with the contents of reverse pointer register 36. Thus, if the pointer (address) of the last page operated upon and the reverse pointer of the current page operated upon do not agree an error condition will be detected and an error signal will be generated. In such a case, comparator 326 produces a signal on line 311 which enables gate 328 thereby setting flip-flop 330 so that circuit 320 produces the error signal on line 310. The presence of the error signal on line 320 enables the contents of the previous present pointer register 302 to be loaded into the present pointer register 40.

The presence of the error signal will thus cause, after the next read operation, the contents of reverse pointer register 36 to be loaded into present pointer register 40. Note that normally the contents of the forward pointer register 38 were so loaded. That is the pages of the record stored on device 28 will now be read in reverse order. Thus the page previously addressed before the error signal condition is detected, is readdressed and a read operation is performed. After this read operation, reverse pointer register 36 is loaded with the reverse pointer for the page just read. This page indicated by the reverse pointer will then be loaded into the present pointer register 40 and a read operation will again be performed for that page. This operation will continue until the data range indicated by counter 32 runs out. Thus the record has been read from the device 28 to memory 22 initially in the normal forward order and then after the error condition is detected, the remaining pages are read in reverse order into memory 22. Data is inhibited from transfer between the processor 20 and the device 28 by means of circuit 322 which includes a one shot multivibrator 332 responsive to the generation of the error signal on line 310. Multivibrator 332 resets flip-flop 334 which is normally set. This inhibits gate 98. Once the contents of the first reverse pointer register 300 and the present pointer register 40 agree as indicated by the comparator 336, flip-flop 334 is again set and gate 98 is thus enabled allowing data transfer.

The apparatus of the error detection and correction apparatus of FIG. 6 will now be more specifically discussed in combination with the exemplary state diagram of FIG. 7. The record to be read is indicated by the table of FIG. 3 starting with the first page A-l. Also indicated in the table of FIG. 3 are the first, second and third pages of a second record which includes pages B1, B2, and B3. Reference will be made to the second record during the error detection and correction sequence. The state diagram assumes by way of example that there is an error in the forward pointer for the second page C-2. In this case the second page C-2 rather than having a forward pointer address to page C-4 has a forward pointer address to the second page B-2 of the second record. Initially, at times T1, T2 and T3 counters 30, 32 and 34 respectively are loaded from processor 20 with the respective information via gates 58, 60 and 62 respectively. After this, at time T4, gate 64 is enabled to address the memory 22 after which also during timing pulse T4, the counter 30 is incremented. Responsive to the address from counter 30, the present pointer register 40 is loaded from processor 20 at time T6 via gate 68. Device 28 is addressed by means of register 40 until a compare is generated by comparator 76 enabling gate 92 and counter 82 to start operation. Because of the organization of the forward and reverse pointers in conjunction with the data field as shown in FIG. 2, the data is read from device 28 first via buffer 46. Buffer 46 is enabled by means of detector 84 and gate 94 after which the data is converted from serial to parallel form by means of gate 96 and buffer 42. The data is finally transferred to the data input of processor 20 by the enabling of gate 48 at time T10 and the enabling of gate 98.

When detector 84 generates the RP and FP signals indicative of the presence of the reverse pointer field and forward pointer field from device 28, gates 110 and 112 are respectively enabled to load the reverse pointer and the forward pointer into registers 36 and 38 respectively. During this time, data range counter 32 is coupled to the input of detector 304 which detects a count of one and produces a level during the first read operation so that when the signal RP is received at OR gate 340, this enables gate 342, further enabling gate 344 so that the contents of the reverse pointer register 36 are transferred into the first reverse pointer register 300. This information will remain in the first reverse pointer register 300 until the data range runs out.

Thus at the end of the first read operation, register 36 includes the address for page B-7, register 40 includes the address for page A-1, register 38 includes the address for page C-2, register 300 includes the address for page B-7, the error signal on line 310 is not generated or is a logical zero, gate 348, 350 and 352 of gate steering logic 324 are disabled because the error signal on line 310 is not present and gates 354 and 88 are enabled because the reset output of flip-flop 330 is a logical one. Thus OR gate 360 receives its input from reverse pointer register 36. Accordingly output of gate 360 on line 312 indicates the address of page B-7. At this time the comparison made between the contents of register 302 and the information on line 312 although compared by comparator 326 is not allowed to affect the operation of the apparatus. This is accomplished by means of detector 370 coupled to data range counter 32 which detector 370 produces a level to inhibit gate 328 until after the second read operation has been completed. Although registers 300 and 40 do not produce a compare, the data transfer between device 28 and processor 20 is that data for page A-1 since flip-flop 334 is normally set enabling gate 98. At time T14 after the data transfer is complete, the contents of forward pointer register 38 are transferred to present pointer register 40 by enabling of gate 88 via OR gate 372. The read operation thus continues in a normal manner so that the data for page C-2 is read from device 28 and so that the reverse and forward pointers are loaded into registers 36 and 38 respectfully. The reverse pointer of page C-2 is the previous page operated on, namely page A-1 which page number has been previously at time T13 loaded into previous present pointer register 302 by the enabling of gate 376.

At this point let us assume that a device error such as a bit drop out has occurred and that the forward pointer rather than being indicative of page C-4, rather is indicative of page B-2. Thus registers 36, 40 and 38 have stored therein the addresses indicative of pages A-1, C-2 and B-2 respectively. At this point the error signal has not yet been generated, and the address on line 312 is indicative of page A-1. Thus the contents of register 302 and the address indicated on line 312 agree so that flip-flop 330 remains reset. The contents of registers 300 and 40 do not yet agree. At time T14 the contents of the forward pointer register 38 which is an erroneous forward pointer is loaded into present pointer register 40 after which the cycle repeats and we find after the third read operation that registers 36 and 40 and 38 have stored therein addresses indicative of pages B-1, B-2, and B-3. Note that these pages are the reverse pointer for page B-2, present pointer B-2 and the forward pointer for page B-2 respectively. Register 300 remains unaffected whereas register 302 has preserved the address for the previous present pointer, namely page C-2.

It will now be noted that after the third read operation, the contents of previous present pointer register 302 and the address indicated on line 312 do not agree, since register 302 points to the pages addressed C-2 and since line 312 indicates the address for page B-1. Thus comparator 326 generates a signal enabling gate 328 and setting flip-flop 330 producing an error signal on line 310.

Figure 2B:
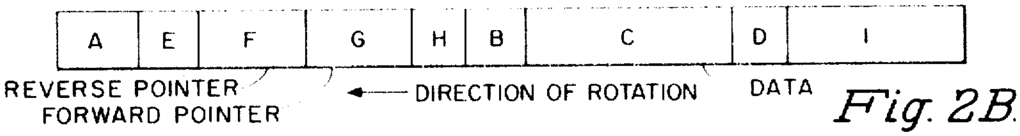
Figure 2C:
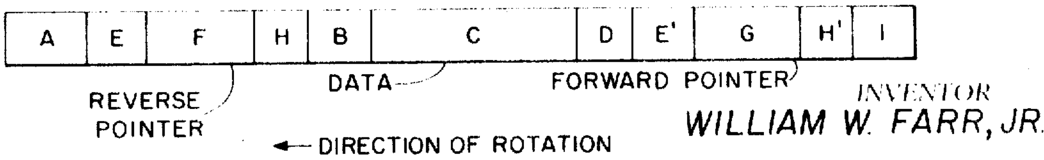

Note that data which in this case is the data for page B-2 would be transferred between the device 28 and the processor 20 because the reverse pointer of the page succeeds the data field, and accordingly the error signal cannot be generated until the data is transferred. This data transfer may be inhibited until after the error condition is detected by various means such as and assuming the format of the present page shown on FIG. 2, the use of buffers the length of the data field for each page so that the data may be temporarily delayed until the error signal on line 310 is generated in which case the data will not be transferred. Alternately, an error check may be provided before the data is transferred by placing the reverse pointer information ahead of the data in the page. FIG. 2B illustrates a page organization which includes fields F and G for the reverse and forward pointers respectively ahead of the data field C. FIG. 2C illustrates a page organization wherein a reverse pointer field F precedes the data field C and wherein the forward pointer field G succeeds data field C. The organization of the page shown in FIG. 2C has at least one additional field of information over and above the page organizations shown in FIGS. 3 and 2B. They are an additional synchronizing pattern such as field E' and possibly an additional check byte pattern shown as field H'.

After the error signal is generated on line 310, flip-flop 380 is set disabling gate 352 and enabling gate 350 so that the contents of the previous present pointer register 302 are loaded into the present pointer register 40. Gate 390 is also disabled so that comparator 326 cannot reset flip-flop 330 when comparator 326 has like inputs. At this time gate 348 is also disabled so that the contents of the forward pointer register 38 are compared with the contents of the previous pointer register 302 by means of comparator 326. Thus after the error signal is generated on line 310 and as indicated by the state diagram of FIG. 7, the registers 36, 40 and 38 have stored therein addresses indicative of pages B-1, C-2 and B-3 respectively.

The error signal on line 310 also inhibits circuit 322, as described hereinbefore, from transferring data. After this time a read operation is performed on the current page C-2 as indicated by the present pointer register 40. After the read operation, the reverse pointer to page A-1, the forward pointer to page B-2 and the present pointer to page C-2 are stored in their respective registers, however, no data can be transferred since the contents of register 300 are not equal to the contents of register 40. The process continues until after fifth read operation when the registers 36, 40 and 38 contain addresses for pages B-7, A-1 and C-2 respectively. The contents, page C-2 of forward pointer register 38 are gated onto line 312 where it is compared with the contents of the previous present pointer register 302 which also includes the address of page C-2. Since both these addresses are equal, comparator 326 generates a signal indicating agreement between both inputs thereto; however flip-flop 330 is not reset because gate 390 is disabled by the logical zero on the reset output of flip-flop 330. Also, no data is transferred since comparator 336 has not produced a compare signal.

The process then continues until after the sixth read operation. The contents of registers 36, 40, and 38 at that time are the addresses of page A-7, B-7, and A-1 respectively. During this time the contents of the first reverse pointer register 300 and the present pointer register 340 agree so that comparator 336 sets flip-flop 334 thereby allowing data through AND gate 98 to be transferred between processor 20 and device 28 and in this case the data to be transferred is that data contained in page B-7, the current page address. Finally, after the seventh and eighth read operations, the data in pages A-7 and C-4 are transferred and subsequently the data range runs out as detected by detector 56, thereby stopping processor 20.

Thus the pages A-1 and C-2, the first and second pages respectively have been read out and transferred in a normal sequence after which time the error signal is generated thereby inhibiting further data transfer until the error has been corrected. After the error has been corrected, the pages are then read out in reverse order so that pages B-7, A-7 and C-4, the fifth, fourth and third pages respectively in the record have been transferred. The pages may be rearranged in memory 22 by means of well known processing techniques which may be utilized in combination with processor 20. Thus although there has been an error in either the forward or reverse pointers as stored in the device 28, the apparatus of the present invention not only detects such error but corrects it and continues transfer of the data in a minimal time period.

The detection and correction of errors during a write operation can also take place. The write operation basically comprises the steps of accessing the forward pointer of the previous page to the page now to be written, accessing the page now to be written by means of the forward pointer of the previous page, reading the reverse pointer of the page which is now to be written, comparing the forward pointer of the previous page and the reverse pointer of the current page and only permitting the device 28 to write when the two last mentioned pointers are the same. The write operation is similar to that of the read operation and need be only generally discussed. During the write operation the record is to be transferred from memory 22 to device 28. The counters 30, 32 and 34, as was the case for the read operation, are loaded after which the memory is addressed by counter 30. After this time, at times T5, T6 and T7, the reverse, present and forward pointers respectively are loaded into their registers 36, 40 and 38 respectively. After a compare is generated by comparator 76 (FIG. 4), the counter 82 is enabled, and a SEND DATA signal is received by processor 20. The data is transferred via gate 80 at time T9 to buffer 42. At time T10, gate 48 is enabled so that the data is serialized via gate 50 by parallel to serial output buffer 44. The data is then written onto the device 28. After this, at time T13, the contents of the present point register 40 are loaded into the reverse pointer register 36 by a gate 86.

After the first write operation, the contents of the registers as was the case for the read operation are indicated in the state diagram of FIG. 7. After the second write operation, the erroneous forward pointer is now stored in forward pointer register 38. After the contents of previous present pointer register 302 does not compare with the reverse pointer indicated by register 36 at the output of gate 360 on line 312, the error signal is generated on line 310. Data is disabled from transfer via circuit 322 and gate 335. The error condition is then corrected as indicated in the state diagram of FIG. 7. Once the contents of the register 300 and register 40 agree the pages are written on device 28 in reverse order, at the proper selected locations however.

Thus the apparatus shown in FIG. 6 in combination with that apparatus of FIG. 4 has performed an error detection and automatic correction operation for both read and write operations in a minimal period of time.

Having now described the invention, what is claimed as new and novel and for which it is desired to secure Letters Patent is:

1. Error detection and correction apparatus coupled with a rotational storage device, said device storing a plurality of pages in a record, each page including data, a reverse and a forward pointer, said reverse pointer linking to the previous page in said record and said forward pointer linking to the next page in said record, said apparatus comprising:

A. means for comparing the reverse pointer of the current page addressed by said apparatus and the address of the page last addressed by said apparatus; and B. means for generating an error signal when said reverse pointer of the current page addressed by said apparatus and said address of the page last addressed by said apparatus are dissimilar.

2. Apparatus as defined in claim 1 further comprising:

A. means responsive to said error signal for addressing the page last addressed by said apparatus; and B. means for addressing the pages of said record in reverse order from said page last addressed by said apparatus.

3. Apparatus as defined in claim 2 further comprising:

A. means for transferring data in said pages between said device and said apparatus; and B. means for disabling said means for transferring said data in response to said error signal.

4. Apparatus as defined in claim 3 further comprising:

A. means for generating a first signal when the address of the current page addressed and the reverse pointer of the first page addressed are similar; and B. means enabling said means for transferring said data in response to said first signal.

5. Error detection and correction apparatus coupled with a rotational storage device, said device storing a plurality of pages in a record, each page including data, a reverse pointer and a forward pointer, said reverse pointer linking to the previous page in said record and said forward pointer linking to the next page in said record, said apparatus further coupled with data processor means which processor means includes storage means, so that said pages are transferred from said processor means to said device during a write operation and so that said pages are transferred from said device to said processor means during a read operation, said apparatus comprising:

A. a present pointer register for storing a present page address of said device to or from which present page address, one of said pages is to be transferred;

B. means for loading said present pointer register with the pointer of said present page;

C. reverse pointer register for storing the reverse pointer of said present page;

D. a forward pointer register for storing the forward pointer of said present page;

E. means for loading said reverse and forward pointer registers with the reverse and forward pointers of said present page;

F. means for transferring said pages between said device and said processor means;

G. means for updating said reverse and forward pointers stored in said reverse and forward pointer registers after said present page is operated upon and after said present page address is changed; and H. means for producing an error signal when said reverse pointer stored in said reverse pointer register and the previous present page pointer are dissimilar, said error signal indicating an error in one of said pointers of said pages in said record.

6. Apparatus as defined in claim 5 wherein said means for updating comprises:

A. means for transferring the pointer of the present page operated upon to said reverse pointer register after said present page is operated upon; and B. means for transferring the contents of said forward pointer register to said present pointer register after said pointer of the present page operated upon is transferred to said reverse pointer register.

7. Apparatus as defined in claim 6 further comprising:

A. means for addressing said device with the previous page pointer utilized to produce said error signal; and B. means responsive to said error signal for transferring said pages of said record in reverse order starting with the page indicated by said previous page pointer utilized to produce said error signal.

8. Apparatus as defined in claim 7 wherein said means responsive to said error signal for transferring said pages comprises:

A. means for disabling the transfer of the contents of said forward pointer register to said present pointer register; and B. means for transferring the contents of said reverse pointer register to said present pointer register.

9. Apparatus as defined in claim 8 further comprising means for inhibiting transfer of data in the pages of said record starting with the page indicated by said previous page pointer utilized to produce said error signal.

10. Apparatus as defined in claim 9 further comprising means for reenabling transfer of data in pages of said record after said pages are addressed in reverse order when the contents of said present pointer register are similar to the reverse pointer of the first page of said record addressed by said present pointer register.

11. Apparatus as defined in claim 8 further comprising:

A. a first reverse pointer register coupled to said reverse pointer register for storing the first reverse pointer of said record received by said reverse pointer register;
B. means for disabling transfer of data of said page between said device and said processor means after said error signal is generated; and
C. means for enabling transfer of data of said pages between said device and said processor means after the contents of said first reverse pointer register and said present pointer register are similar.

12. Error detection and correction apparatus coupled with a rotational storage device, said device storing a plurality of pages in a record, each page including data, a reverse pointer and a forward pointer, said reverse pointer linking to the previous page in said record and said forward pointer linking to the next page in said record, said apparatus comprising:

A. a present pointer register for addressing the current page to be operated upon;
B. a reverse pointer register for storing the address of the page immediately preceding said current page;
C. a forward pointer register for storing the address of the page immediately following said current page;
D. means for loading said present, reverse and forward pointer registers with said present, reverse and forward pointers respectively;
E. a previous present pointer register coupled to said present pointer register for storing the address of the previous current page addressed;
F. means for transferring the contents of said forward pointer register to said present pointer register after the current page addressed is operated upon;
G. means for generating an error signal when the contents of said reverse pointer register and the contents of said previous present pointer register are dissimilar;
H. means for transferring the contents of said previous present pointer register into said present pointer register in response to said error signal; and
I. means for transferring the contents of said reverse pointer register into said present pointer register after the page indicated by said present pointer register in response to said error signal is operated upon.

13. Apparatus as defined in claim 12 further comprising:

A. a first reverse pointer register coupled to said reverse pointer register for storing the first reverse pointer of said record received by said reverse pointer register;
B. means for disabling the transfer of data between said device and said apparatus after said error signal is generated; and
C. means for enabling transfer of data between said device and said apparatus after said error signal is generated and after the contents of said first reverse pointer register and said present pointer register are similar.

* * * * *